Figure 1:
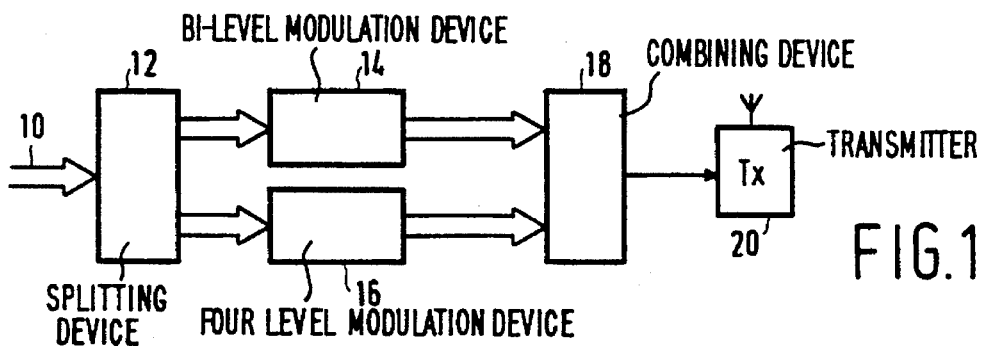

United States Patent [19]

Marshall

[11] Patent Number: 5,502,744
[45] Date of Patent: Mar. 26, 1996

[54] DATA CODING SYSTEM

[75] Inventor: Christopher B. Marshall, Stein, Germany

[73] Assignee: U.S. Philips Corporation, New York, N.Y.

[21] Appl. No.: 102,012

[22] Filed: Aug. 4, 1993

[30] Foreign Application Priority Data

Aug. 21, 1992 [GB] United Kingdom ............... 9217819

[51] Int. Cl.$^6$ ............... H04L 27/00; H04L 5/12
[52] U.S. Cl. ............ 375/259; 375/261; 375/377; 371/56; 341/50
[58] Field of Search ............ 375/39, 261, 377, 375/121, 259, 37; 371/56; 341/50

[56] References Cited

U.S. PATENT DOCUMENTS

| | | | |
|---|---|---|---|
| 4,346,473 | 8/1982 | Davis | 371/43 |
| 4,602,374 | 6/1986 | Nakamura et al. | 375/17 |
| 5,289,501 | 2/1994 | Seshadri et al. | 375/39 |
| 5,305,352 | 4/1994 | Galderbank et al. | 375/39 |

FOREIGN PATENT DOCUMENTS

| | | | |
|---|---|---|---|
| 0282298 | 9/1988 | European Pat. Off. | H03M 13/00 |
| 0490552 | 6/1992 | European Pat. Off. | H04L 27/34 |

OTHER PUBLICATIONS

Bedrosian, "Weighted PCM*", IRE Transaction on Information Theory, Mar. 1958.
Biglieri et al., "Multidimensional Signaling For Intersymbol Interference Channels", Intenational Telecommunications Sympoium, pp. 302–306.
Delgado, "Power Spectral Density of a Novel Adaptive Multilevel Line Code", International Telecommunications Sumposium ITS [90, Sep. 9,1990, pp. 525–528.

*Primary Examiner*—Edward L. Coles, Sr.
*Assistant Examiner*—Madeleine Anh-Vinh Nguyen
*Attorney, Agent, or Firm*—Anne E. Barschall

[57] ABSTRACT

A system for communicating digital data comprises a splitting device (38) for separating an input digital data word, which may be provided by a speech coding arrangement (34,36), into most significant bits and less significant bits. The most significant bit(s) of the digital data word are encoded (40) using a robust signalling alphabet and less significant bit(s) are encoded (42,44) using progressively less robust signalling alphabets. All of the symbols resulting from the encoding are combined (46) and transmitted (48). On reception (50) the received signal is split (52) and demodulated (54,56,58) to provide respective portions of a received data word to a combining means (60). Where the data word was originally provided by speech coding arrangement the received data word may be provided to a resynthesising arrangement (62,64). The signalling alphabets may comprise 2-level modulation, 3,4 and 8-level modulation and/or phase modulation of various degrees.

27 Claims, 4 Drawing Sheets

DATA CODING SYSTEM

The present invention relates to a data coding and decoding system having particular, but not exclusive, application to the communication of parameter values in a noisy environment. The invention also relates to a communications system and to transmission and reception arrangements for use in such a system. The invention further relates to the encoding and decoding arrangements deployed in such systems.

Increasing the capacity and robustness to errors of communications and data storage systems have been the object of much research effort. In 'Weighted PCM' by Edward Bedrosian, IRE Transactions on Information Theory, March 1958 a technique is described in which the relative amplitudes of the pulses in a pulse code modulation scheme are adjusted to minimise the noise power of the reconstructed signal due to errors in transmission. In brief, those pulses which have a greater effect on the reconstructed signal are transmitted at a higher amplitude than the others, subject to the constraint that the overall message power transmitted is constant. A performance analysis described in the paper exhibits a significant increase in signal to noise ratio. Such techniques, however, have not been widely used and it has been suggested that this is due to the higher power capability and large number of different quantisation levels required at the transmitter. In addition there has been an increase in emphasis on modulation schemes and error correction coding.

It is an object of the present invention to provide a data communication system providing improved capacity together with a robustness to errors.

According to a first aspect of the present invention there is provided a system for communicating digital data words, comprising means for generating a first symbol in response to a more significant section of each digital data word, means for generating a second symbol in response to a less significant section of each digital data word, the second symbol representing a greater number of states than the first symbol, means for combining the first and second symbols to provide an encoded signal, means for transmitting the encoded signal, means for receiving the transmitted encoded signal, means for separating a received signal into first and second received symbols, means for deriving a more significant section of received data from the first symbol, means for deriving a less significant section of received data from the second symbol and means for combining the more significant section and the less significant section of the received data to provide an output digital data word.

By generating at least two symbols based upon a digital data word, the more significant bit or bits of the word can be transmitted in a reliable manner using for example bi-level (binary) amplitude modulation or other robust signalling. The less significant bits are considered as one or more sub-sections each representing a larger number of states and these are converted to one or more multi-state symbols for transmission in a shorter time interval than would apply if binary modulation were used. The less significant bits are more prone to error using such a technique but the gain in channel capacity outweighs this disadvantage where parameters or quantised analogue quantities are being transmitted. This gain in channel capacity may be used to improve the channel robustness or to provide extra channels.

The less significant bits may thus be transmitted using, for example, amplitude modulation, quadrature amplitude modulation (QAM), quadrature phase shift keying (QPSK) or 8-PSK while the more significant bits are transmitted using bi-level or bi-phase modulation, 3-level modulation and so on. Longer words may be separated into a greater number of sub-sections, for example an eight bit digital word may be encoded as four 2-state symbols, a 3-state symbol and an 8-state symbol. A word which is coded in accordance with the present invention may comprise a non-integer number of bits. The boundaries between bits in the word will not necessarily correspond to the boundaries between symbols.

The length of time for which a symbol is transmitted also directly affects the likelihood of error. The time saved, compared to a purely bi-level system, by representing the less significant bits of a data word as a multilevel signal having 3 or more levels could be used to increase the duration of the symbol or symbols representing the most significant bit or bits. The duration of such a symbol may conveniently be an integer multiple of the duration of the other symbols used to represent a word but other durations are possible.

Two symbols may be transmitted simultaneously in different modulation dimensions using, for example, Quadrature Amplitude Modulation or Phase Shift Keying.

Providing the most robust transmission for the most significant bits of a data word is particularly applicable to a system for communicating digitised analogue signals. For such a purpose, means are provided to digitise the analogue signals at the input to the system and to derive a replica of the digitised signals at the output of the system.

According to a second aspect of the present invention there is provided a digital data transmission arrangement for use with a system in accordance with the first aspect of the present invention, comprising means for generating a first symbol in response to a more significant section of each digital data word, means for generating a second symbol in response to a less significant section of each digital data word, the second symbol representing a greater number of states than the first symbol, means for combining the first and second symbols to provide an encoded signal and means for transmitting the encoded signal.

In such a transmission arrangement it may be desirable to keep the average power of the first and second symbols substantially the same.

A four-bit data word may, by use of the present invention, be represented by two 2-state symbols for the two most significant bits and one 4-state symbol for the two least significant bits. The saving in time thus effected may be used to double the length of the symbol representing the most significant bit with a consequent reduction in its susceptibility to error.

An eight-bit data word may be represented by four 2-state symbols for the four most significant bits and by two further symbols for the remaining bits. For example, the four least significant bits could be represented by two 4-state symbols or by a 3-state symbol and an 8-state symbol. The latter option may be arranged to leave two of the possible states of the 8-state symbol unused which may be used to provide a useful extra clearance between certain adjacent states.

The allocation of transmission time to particular bits within a word may be made in non-integer subdivision of a clock interval. This may, however, have an effect on successful clock recovery at a receiver.

According to a third aspect of the present invention there is provided a digital data reception arrangement for use with a system in accordance with the first aspect of the present invention, comprising means for receiving a transmitted signal, means for separating a received signal into first and second symbols, means for deriving a more significant section of received data from the first symbol, means for deriving a less significant section of received data from the second symbol and means for combining the more significant section and the less significant section of the received data to provide an output digital data word.

The present invention also provides a system for encoding digital data words and a system for deriving data words from an encoded signal which embody the techniques discussed. Such systems may be used in conjunction with storage devices to provide compact data storage arrangements.

Figure 2:
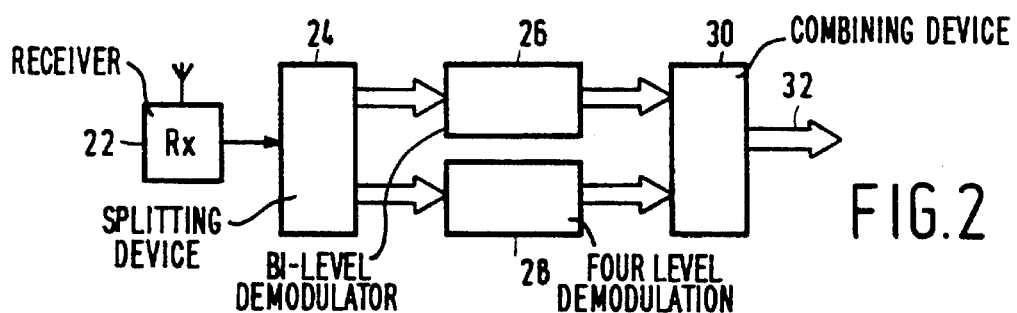
Figure 3:
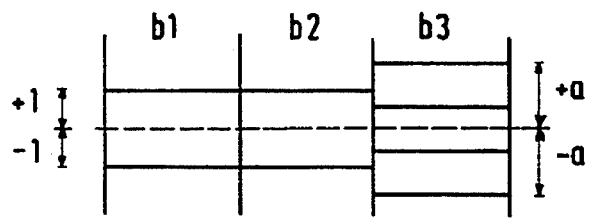
Figure 4:
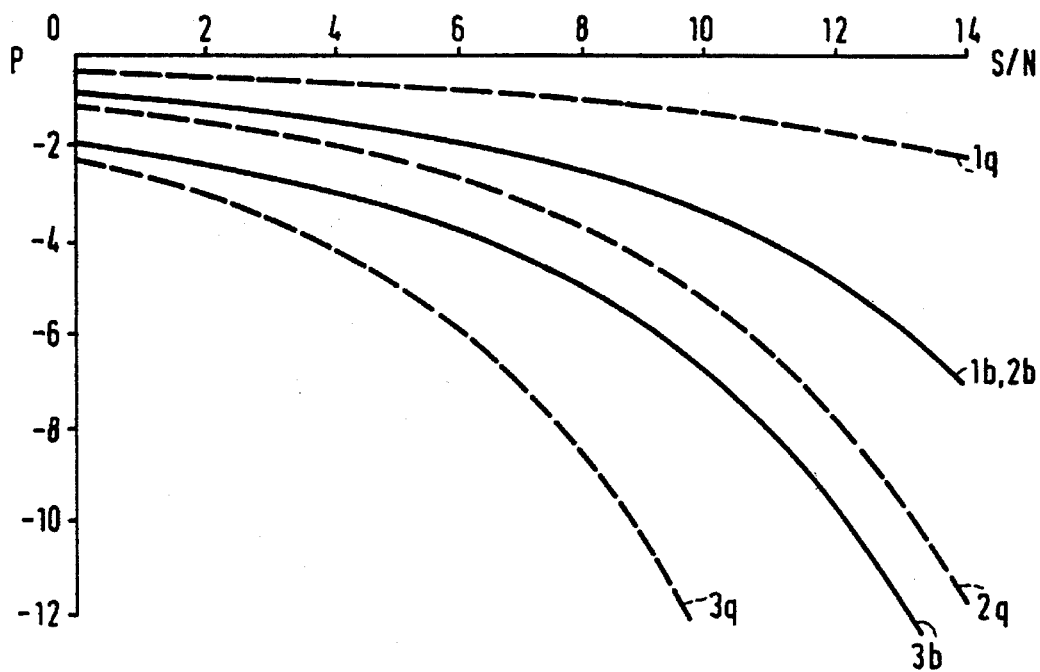
Figure 5:
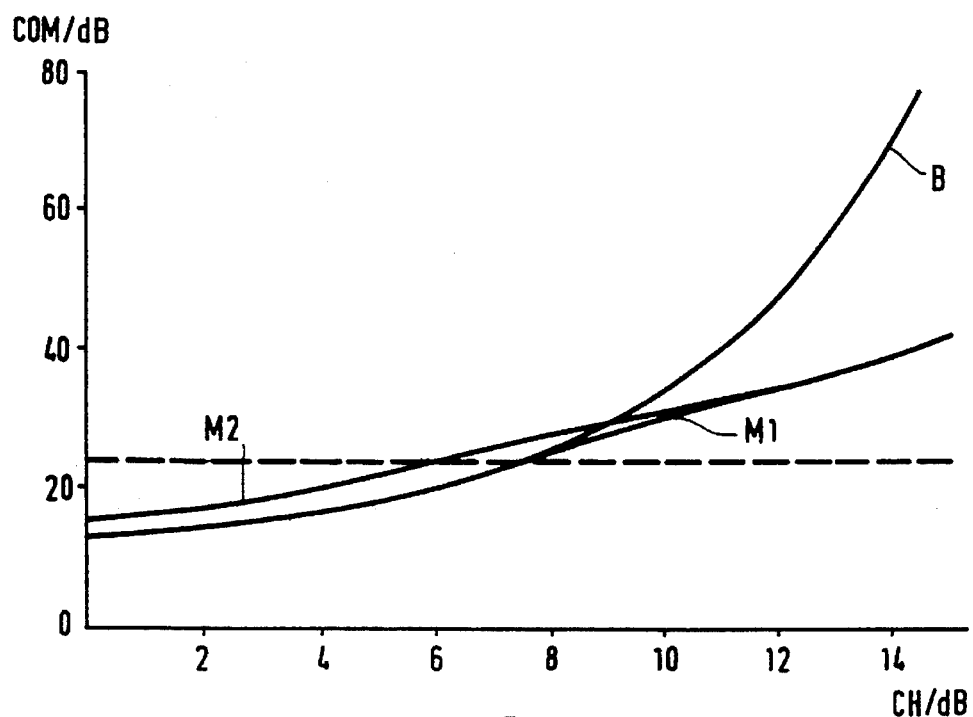
Figure 6:
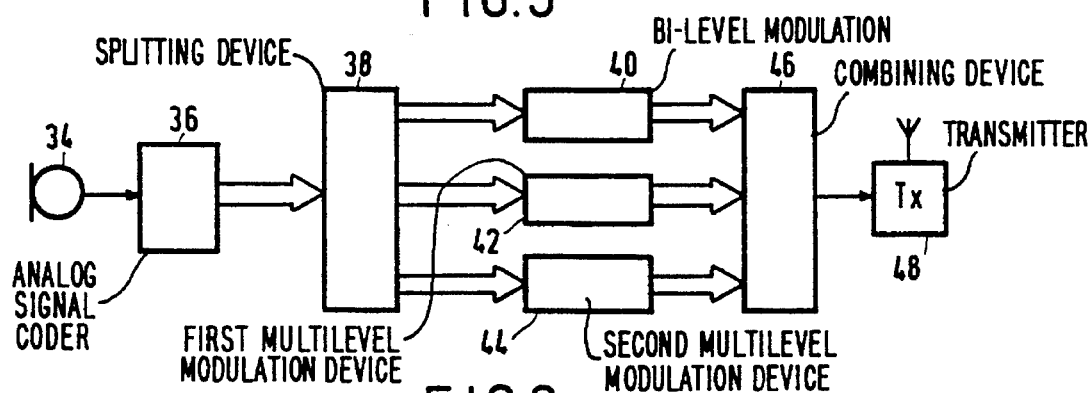
Figure 7:
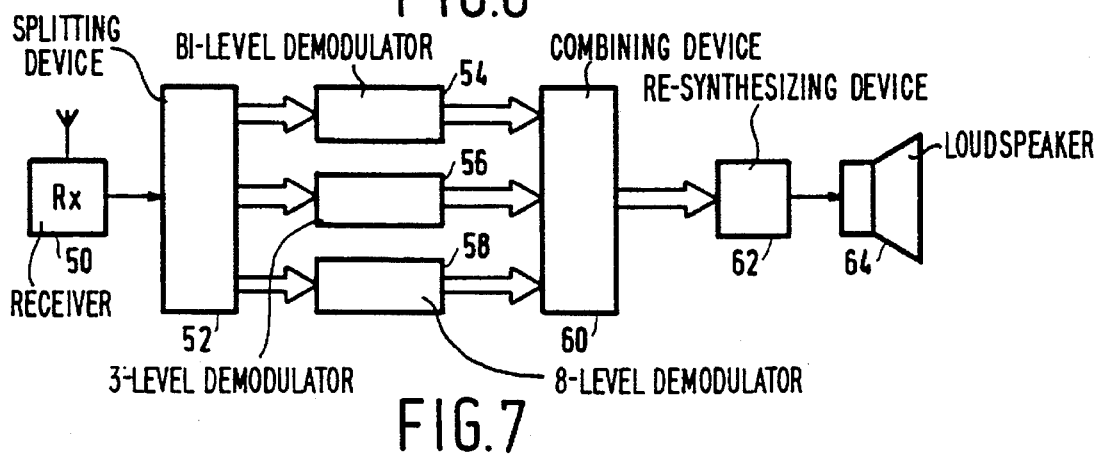
Figure 8:
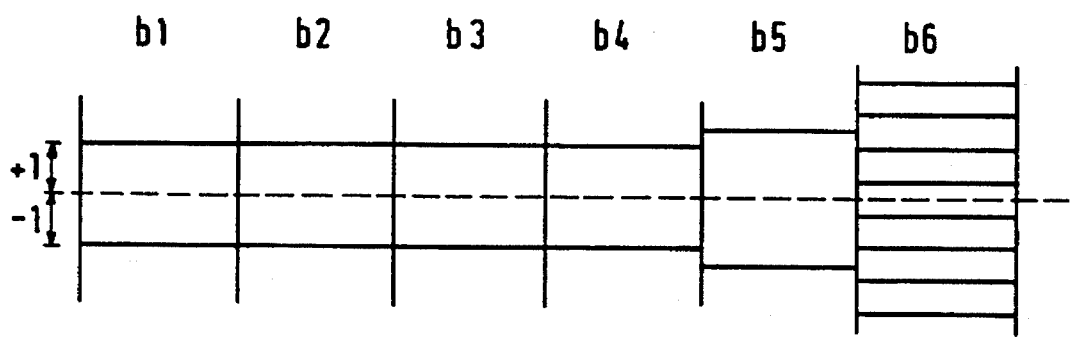
Figure 9:
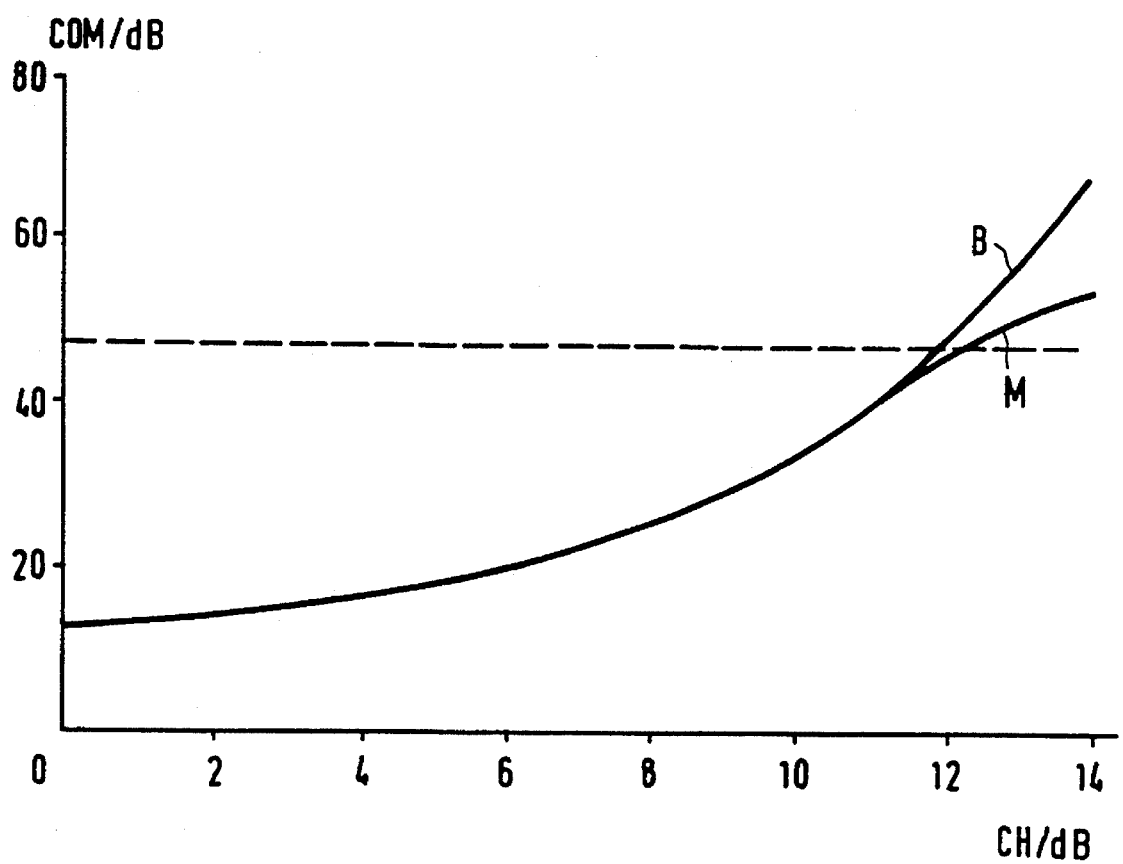
Figure 10:
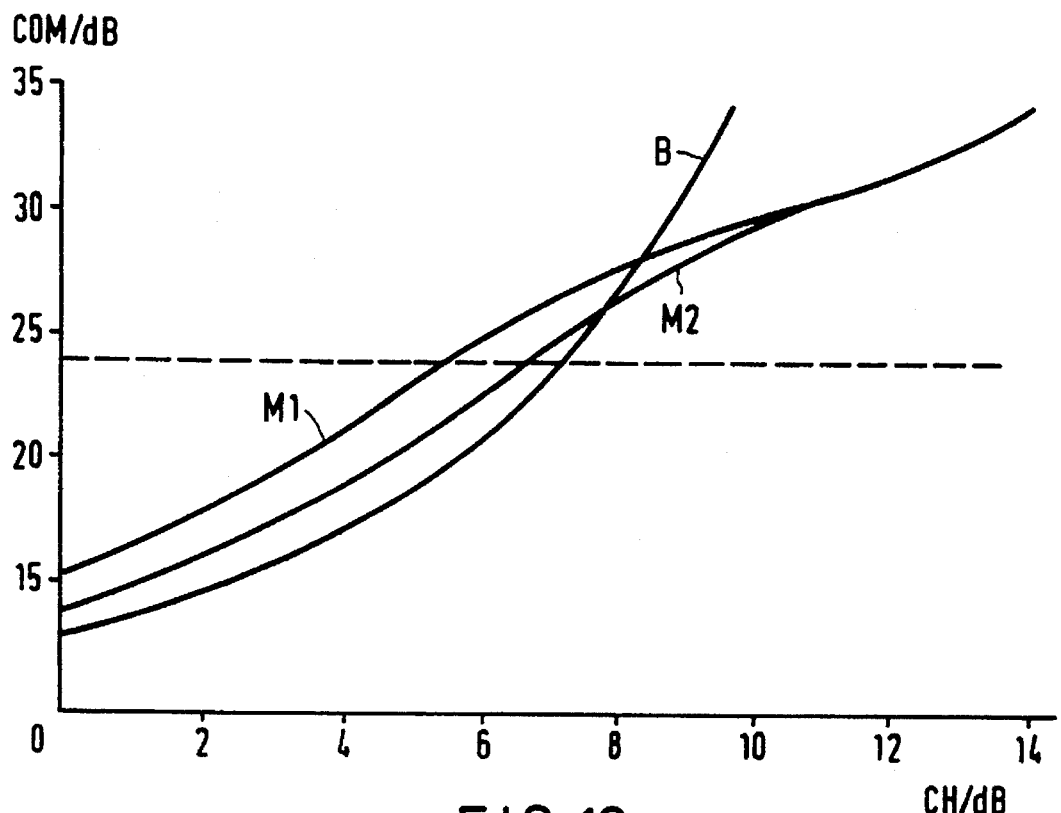
Figure 11:
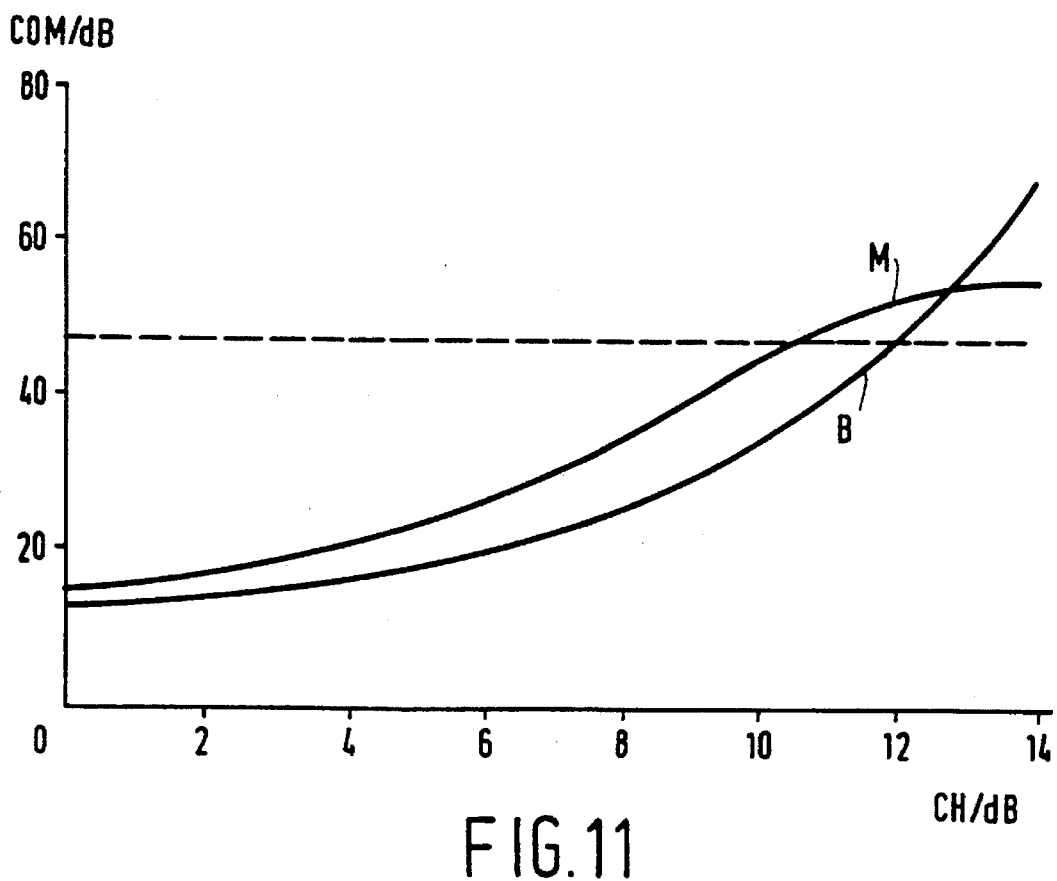

The present invention will now be described, by way of example, with reference to the accompanying drawings, in which:

FIG. 1 is a block schematic diagram of a data transmission arrangement in accordance with the present invention, FIG. 2 is a block schematic diagram of a data reception arrangement for use with the transmission arrangement of FIG. 1, FIG. 3 shows the possible output levels when the transmission arrangement of FIG. 1 is used to encode a four bit data word, FIG. 4 is a graph of a comparison of error probability between a standard binary signalling system and an arrangement which uses a four-level symbol, FIG. 5 is a graph of the effect of using a four-level symbol in a multilevel symbol technique on communicated signal to noise ratio at varying channel signal to noise ratios, FIG. 6 is a block schematic diagram of a transmission arrangement in accordance with the invention for transmitting 8-bit data words, FIG. 7 is a block schematic diagram of a reception arrangement for use with the transmission arrangement of FIG. 6, FIG. 8 shows the possible output levels of the transmission arrangement of FIG. 6, FIG. 9 is a graph of a comparison of error probability between a standard bi-level signalling system and the arrangements of FIGS. 6 and 7, FIG. 10 is a graph of error probability for a bi-level system and two multilevel techniques coding a 4-bit word using non-integer clock interval multiples, and FIG. 11 is a graph of error probability for a standard bi-level signalling system and a multilevel technique coding an eight-bit word using non-integer clock interval multiples.

In FIG. 1 a four bit digital data word is fed to an input 10 to a splitting device 12 which separates the word into the two most significant bits and the two least significant bits. If the four bit digital word is supplied in a parallel format, the splitting device 12 may be no more elaborate than tracks printed on a circuit board. Where the word is supplied in a serial format the device 12 may comprise a multiplexer. The two most significant bits are fed to a bi-level modulation device 14 which is arranged to provide a signal having a first level if the binary signal is a 'one' and a second level if the binary signal is a 'zero'. Typically these levels will be assigned the arbitrary values of plus one and minus one respectively. The device 14 provides a pair of symbols each of which represents one of the two most significant bits of the data word in a bi-level format and having a length of one clock interval. The two least significant bits are fed to a four-level modulation device 16 which provides an output symbol one clock interval long which represents the two bits as a single symbol which may assume any one of four states. Multilevel modulation is described in greater detail in 'Digital Transmission Systems' by David R. Smith, published by Van Nostrand Reinhold. The modulated symbols are fed to a combining device 18 which places them in an appropriate order for transmission and provides them to a transmitter (Tx) 20 for transmission over a channel. While a transmitter for a radio system is depicted, transmission may be effected over alternative channels, for example a fixed line or an optical fibre link, or the symbols may be stored in an appropriate medium, for example magnetic or optical, for later retrieval.

FIG. 3 shows the possible states of the output of the combining device 18 of FIG. 1 during a first clock interval b1, a second clock interval b2 and a third clock interval b3. It is apparent from the drawing that the four-level signal which occupies clock interval b3 has a higher peak amplitude than the two-level signals in the first and second clock intervals. This is so that the symbol transmitted in the third clock interval has the same average power as each of those transmitted in the first two. If it is assumed that the peak amplitude of the multi-level symbol is a, that the levels are equidistant and all equally likely, then $\frac{1}{2}(a^2 + (\frac{1}{3}a)^2) = 1$ which gives a=1.34.

A more general formula for a is $$a = \sqrt{3\frac{S-1}{S+1}}$$

where S is the number of states which the symbol may assume. Where the likelihood of occurrence of particular states differs, the average expected power is the sum of the powers of the levels multiplied by their probability of occurrence.

FIG. 2 shows a reception arrangement for use with the arrangement of FIG. 1 in which a receiver (Rx) 22 has an output which is coupled to a splitting device 24 having two outputs. A first output is coupled to a demodulator 26 and a second output is coupled to a demodulator 28. The bi-level symbols are demodulated in the demodulator 26 to provide a binary output to a first input of a combining device 30. The four-level symbol is demodulated in the demodulator 28 to provide a binary output to a second input of the combining device 30. The combining device 30 provides a four bit word at an output bus 32. The device 30 may be no more complex than tracks on a printed circuit board if the outputs of the demodulators are in parallel and are active simultaneously.

FIG. 4 shows the error performance of a four level symbol when compared to a pair of bi-level symbols using a root mean square (RMS) error criterion. The horizontal axis S/N is the signal to noise ratio of the channel over which communication is to occur expressed in dB and the vertical axis is the probability of error P expressed in negative powers of ten. The dashed lines 1q, 2q and 3q represent the probabilities of an error of distance 1, (in other words, 1 sent, 2 received, 4 sent, 3 received and so on) distance 2 and distance 3 respectively, using a single four-level symbol. The probability of an error of distance 1 is quite likely but errors of distance 2 or 3 are rather unlikely. The solid lines 1b, 2b and 3b represent the probabilities of an error distance of either 1 or 2 and an error of distance 3, respectively, when using two, 2-level symbols. The probabilities of an error distance of 1 or 2 are virtually equal since these correspond to a single error in the less significant bit and to a single error in the more significant bit respectively. The error probabilities are not quite the same because of the small but finite chance of having an error in both bits, which marginally increases the probability of an error distance of one as a result of the possibility of the corruption from 10b to 01b and vice versa. As can be observed, the likelihood of an error of distance 1 using the two, 2-level symbols is much less likely than when using a single 4-level signal. However, the likelihood of error of distance 2 using the two, 2-level symbols is significantly more likely than when using a 4-level symbol. Where parameters or continuously varying quantities are being transmitted in a digital format, an error in the least significant bit may well go unnoticed but errors in more significant bits may well be intolerable. In such circumstances the performance of the 4-level symbol could well be preferable to that of the two, 2-level symbols.

FIG. 5 shows the communicated (COM) signal to noise (S/N) ratio on the vertical axis against channel (CH) signal to noise ratio on the horizontal axis for a four-bit data word transmitted in four clock intervals as four 2-level symbols (B) and in three clock intervals as two 2-level symbols and a 4-level symbol (M1). At channel S/N ratios of 7 dB or less the communicated S/N ratios are virtually identical but above 7 dB the pure 2-level system has superior performance. Also plotted in the Figure as a broken line is the magnitude of the least significant bit, 6 dB×4=24 dB. It can be argued that accuracy much greater than that of the least significant value bit is of no practical use when communicating parameter values. Indeed, there will often not have been any greater accuracy in the source signal, which may have been quantised to 4 bits and subject to quantisation noise accordingly. A recovered rms error value that is significantly less than the smallest bit is therefore of little advantage and if it can be traded for another property then it should be. In the case of the multilevel technique here, it has been traded for a reduction in transmission time.

FIG. 5 also shows a curve (M2) which is the communicated S/N ratio against channel S/N ratio for a four-bit data word transmitted as three 2-level symbols and a 4-level symbol, the most significant bit being transmitted as two, 2-level symbols. The performance using this technique is better than that of the three symbol technique at channel S/N ratios of less than approximately 11 dB and better than the four 2-level symbol technique at channel S/N ratios of less than approximately 9 dB. Both of the techniques which use a 4-level symbol are limited in their performance by the presence of that symbol when a good channel is available.

Two symbols may be transmitted simultaneously in different modulation dimensions using quadrature channels for example. Consider a three bit word encoded as a 2-level symbol for the most significant bit and a 4-level symbol for the remaining bits. Instead of transmitting the two symbols during different clock intervals, a first quadrature channel can transmit the 2-level symbol and a second quadrature channel can transmit the 4-level symbol. Because of the greater peak amplitude of the 4-level symbol as described previously, the peak amplitude of the signal in the second quadrature channel is greater than that of the first quadrature channel. Thus the two symbols are combined in different modulation dimensions rather than in different clock intervals. Alternatively this symbol combination may be considered as a quadrature amplitude modulated (QAM) signal in which one of the modulation dimensions is weighted differently to the other.

Using the previous 4 symbol example, one quadrature channel could carry two 2-level symbols representing the most significant bit one symbol after the other while at the same time the other channel could carry the remaining 2-level symbol followed by the 4-level symbol. This is analogous to a QAM arrangement comprising a clock interval containing 4-QAM signal and a clock interval containing an 8-QAM signal with differently weighted modulation dimensions.

The two symbols representing different respective numbers of states in accordance with the invention may comprise a traditional QAM symbol (having equal interstate separations in the two dimensions) together with a one dimensional multi-level symbol or even a QAM symbol representing fewer states. QAM is described in more detail in the book 'Digital Transmission Systems' identified above. Briefly, in 16-QAM four different levels in each of two different modulation dimensions combine to provide 16 separate states. This modulation may be used for less significant bits of a word while 2-level (or 3-level and so on) modulation is used for the more significant bits. One possible allocation for the values of a digital word applied to a 16-QAM signal is shown as a simple grid, thus:

| 1 | 2 | 3 | 4 |
| 5 | 6 | 7 | 8 |
| 9 | 10 | 11 | 12 |
| 13 | 14 | 15 | 16 |

The aim when assigning states to the word values is to arrange for the values of adjacent states of the modulation to provide the minimum RMS error on reception or decoding when adjacent states are mistaken for one another, for example due to noise on a communication channel.

A 16-QAM signal may be used to represent sixteen states which correspond to four bits of a digital word and so enable longer digital words to be communicated in fewer clock intervals. Alternatively such a signal could be used, for example, to represent ten or twelve different states and error detection or correction coding which is known in the art could be applied to these states to exploit the remaining available states in 16-QAM.

As a further alternative the 16-QAM symbol may be used to represent fewer than sixteen states without attempting to use all or any of the unused states to provide error coding. The greater distance between certain adjacent states will provide an improvement in performance in its own right. For example, the allocation of 14 of the 16 states as depicted below results in approximately 75% of the RMS error of the allocation of 16 states shown above:

| 1 | 2 | 4 | 7 |
| 3 | 5 |  | 9 |
| 6 |  | 10 | 12 |
| 8 | 11 | 13 | 14 |

Fewer still of the states could be allocated to provide more robust transmission. A coding system in accordance with the invention may thus provide a plurality of 16-QAM signals to encode a word. The more significant bits of the word will be encoded with a less-dense (or sparse) 16-QAM allocation than the less significant bits. Such less-dense QAM allocations can conveniently be considered as one symbol rather than as two symbols in different modulation dimensions since the QAM signal cannot readily be decomposed into symbols representing different numbers of states. Where the smallest interstate separation in the two dimensions differs, this can be considered as two symbols in different modulation dimensions even if not every state in those two symbols is allocated.

The exploitation of multi-dimensional modulation in accordance with the invention may be extended to three dimensions and beyond.

FIG. 6 shows a transmission arrangement in accordance with the present invention for transmitting digitally encoded analogue signals. A source of analogue signals, depicted as a microphone 34 has an output coupled to a code excited linear prediction (CELP) analogue signal coding arrangement 36. Other types of coding arrangement are suitable for use in the transmission arrangement, particularly parameter-based arrangements such as vocoders. The output of the arrangement 36 is a set of digital parameter values comprising up to eight bits each and these are supplied in sequence to a splitting device 38 having three outputs. A first output of the device 38 comprises the four most significant bits of the parameters and this output is fed to a bi-level modulation device 40 which provides four 2-level modulated symbols to a first input of a combining device 46. A second output of the device 38 comprises the fifth and sixth most significant bits of the parameter and is fed to a first multilevel modulation device 42. An output of the device 42 is a three-level symbol which is fed to a second input of the combining device 46. A third output of the device 38 comprises the sixth, seventh and eighth most significant bits of the parameter and is fed to a second multilevel modulation device 44. An output of the device 44 is an 8-level symbol which is fed to a third input of the combining device 46. The device 46 arranges the six symbols into a serial stream and couples them to a transmitter (Tx) 48 for transmission. In this arrangement the four least significant bits, which may represent one of sixteen states are sub-divided into a factor of three represented by a three-level symbol and the factor of six represented by an eight-level symbol. A six-level symbol could be used in place of the eight level symbol. Alternatively, error detection or correction coding could be applied to the least significant bits to provide twenty-four states altogether, thus fully exploiting the states which may be represented by the three-level and the eight-level symbols. More simply the states of the digital word could be applied to the eight-level symbol to maximise the distance of the states from each other and provide more robust coding as described above. Of course certain parameters produced by the arrangements 36 may have no particular weighting towards any of the bits which they comprise and these parameters may be transmitted using a purely 2-level technique or the same multi-level symbols for the whole parameter in the usual manner. The splitting device 38 may thus be arranged to apply the whole of such a parameter to the appropriate modulation device.

FIG. 8 shows the possible states of the output of the combining device 46 (FIG. 6) during clock intervals b1 to b6. The 3-level symbol in interval b5 has the effect of decreasing the significance of the following symbol, reducing the level of its error contribution.

FIG. 7 shows a reception arrangement for use with the transmission arrangement of FIG. 6. A radio receiver (Rx) 50 has an output which is coupled to a splitting device 52 having three outputs. A first output of the device 52 is fed to a bi-level demodulator 54 and comprises the four 2-level symbols of the received signal. A second output of the device 52 is fed to a 3-level demodulator 56 and comprises the 3-level symbol of the received signal. A third output of the device 52 is fed to an 8-level demodulator 58 and comprises the 8-level symbol of the received signal. Outputs of the three demodulators are fed to respective inputs of a combining device 60 which converts the demodulated signals to a parallel data word. The parallel data word is fed to a CELP analogue signal re-synthesising device 62 whose output is coupled to a transducer, in this case a loudspeaker 64.

The arrangements of FIGS. 6 and 7 are applicable to the communication of signals other than analogue signals if the analogue signal encoding and decoding devices are omitted. An eight bit word may thus be transmitted in just six clock intervals. Longer words may also be communicated by selecting appropriate symbols and using more clock intervals.

FIG. 9 shows a graph comparing the performance of the transmission arrangement of FIGS. 6 and 7 with a system in which all eight bits are encoded as bi-level symbols. The vertical axis (COM) is the communicated S/N ratio of the transmitted signals and the horizontal axis (CH) is the channel S/N ratio. The curve B shows the performance of the bi-level system in 8 clock intervals and the curve M shows the performance of the multilevel technique in 6 clock intervals. As can be seen the performance of the two systems are virtually identical for channel S/N ratios below 11 dB and do not differ to a great extent even at S/N ratios greater than this. As in FIG. 5 a broken line is included in the Figure to indicate the limit of useful accuracy, in this case 48 dB. As can be seen the multilevel technique produces virtually the same performance up to this limit.

As an alternative to amplitude modulation, multi-state symbols may be generated by Phase Shift Keying (PSK) where the particular states are modulated at the transmitter as a series of phase or angle variations. Binary PSK is capable of sending one of two possible states per symbol by using one of two signals at relative phase shifts of 0 and Π respectively. Quadrature PSK uses relative phase shifts of 0, Π/2, Π and 3Π/2 radian and 8-PSK uses relative phase shifts of 0, Π/4, Π/2, 3Π/4, Π, 5Π/4, 3Π/2 and 7Π/4 radian.

A system in accordance with the invention which uses PSK may comprise the arrangement of FIG. 1 in which the modulation devices 14,16 are arranged to provide two binary PSK symbols and a quadrature PSK symbol respectively. The combining device 18 and the Tx 20 are arranged to operate with PSK signals. Similarly the Rx 22, splitting device 24 and demodulation devices 26,28 of FIG. 2 are arranged to operate with PSK signals. The use of PSK may be extended to further multistate symbols such as a combination of binary, quadrature and 8-PSK in a similar manner to that described for multi-level symbols above.

On reception of PSK signals, when an error is made a signal sent as one state is equally confusable with the two adjacent states as is the case for amplitude modulation. However, there is an additional complication due to the nature of PSK, that of a cyclic error effect, meaning that a phase signal transmitted as 0 radian in 8-PSK may be received as Π/4 radian or 7Π/4 radian with equal probability. Thus, if a straightforward allocation were to be made of the eight states represented by the digital word to those of the PSK, there could be an error in transmission of a single phase graduation which would cause a signal transmitted in the first state to be received as a signal in the last state and vice versa. To prevent such a minor error of just one phase graduation from affecting the received value to such an extent the eight states of the word could be allocated to PSK phases as follows:

| State | Phase |
|-------|-------|
| 1 | 0 rad |
| 3 | π/4 |
| 5 | π/2 |
| 7 | 3π/4 |
| 8 | π |
| 6 | 5π/4 |
| 4 | 3π/2 |
| 2 | 7π/4 |

Thus a transmission error of one phase graduation, or Π/4, can never result in a perceived error in a digital word having a magnitude of more than two states.

Different styles of state allocation may be applied to PSK coding using different numbers of states. For example, where a 12-state symbol is used a straightforward allocation would be:

1 2 3 4 5 6 7 8 9 10 11 12 but the RMS error may be reduced by 4 dB using the following allocation:

1 2 3 5 6 8 9 11 12 10 7 4.

A further slight improvement can be obtained using:

1 3 5 7 9 11 12 10 8 6 4 2.

In a similar manner to the above combination of two multi-state symbols in different modulation dimensions, two symbols can be combined in a single PSK signal. For example a 2-state symbol and a 4-state symbol could be combined by allocating 0 radian to one of the states of the 2-state symbol and Π radian to the other state. The states of the 4-state symbol could be allocated −Π/4, −Π/12, +Π/12 or +Π/4 respectively. A combination of the two symbols results in an eight state symbol with unequal interstate graduations. There is a minimum angle of Π/2 between the states of the 2-state symbol and a minimum angle of Π/6 between the states of the 4-state signal, thus providing different degrees of protection to the most significant bit and the remaining bits.

As was observed earlier, with reference to FIG. 5, representing the most significant bit by more than one symbol has quite a noticeable effect on the performance of the system when compared with a most significant bit communicated in just one clock interval. This effect can be extended to alteration of the duration of all of the symbols to be transmitted.

In the case of the four-bit word, the saving of one clock interval by using multiple symbol signalling as opposed to a pure 2-level system, can be used to extend the duration of the three symbols by a factor a 4/3. The channel noise will be reduced by 10 log [4/3]=1.25 dB with a consequent improvement in the sensitivity of the communication system. However there may be problems with clock recovery at the receiving end of the system.

Alternatively the duration of the symbols can be made different from each other. One possible allocation of 4 clock intervals to a four-bit word is:

| Message bit | Symbol | Symbol Duration |
| --- | --- | --- |
| 1 (MSB) | bi-level | 2.25 |
| 2 | bi-level | 1.25 |
| 3 | ) 4-level | 0.5 |
| 4 | | |

To transmit a four-bit word in three clock intervals, a possible allocation is:

| Message bit | Symbol | Symbol Duration |
| --- | --- | --- |
| 1 (MSB) | bi-level | 1.6 |
| 2 | bi-level | 0.9 |
| 3 | ) 4-level | 0.5 |
| 4 | | |

FIG. 10 shows the communicated S/N ratio (COM) on the vertical axis against the channel S/N ratio (CH) on the horizontal axis for a pure bi-level symbol scheme (B), the four clock interval (M1) scheme and three clock interval (M2) scheme above. By comparison with FIG. 5 the improvement in performance of the non-integer clock interval allocations over a system in which the symbol edges coincide with the clock interval boundaries can be seen. The four clock interval scheme has a sensitivity of 1.7 dB better than the pure bi-level scheme while even the three clock interval scheme can out-perform the pure bi-level system, despite occupying only three quarters of the transmission time. As before, a limit of useful accuracy is shown by a broken line at 24 dB communicated S/N.

Unequal symbol durations can be applied to a system for encoding an 8-bit data word in 8 clock intervals. One possible allocation is as follows:

| Message bit | Symbol | Symbol Duration |
| --- | --- | --- |
| 1 (MSB) | bi-level | 1.78 |
| 2 | bi-level | 1.47 |
| 3 | bi-level | 1.21 |
| 4 | bi-level | 0.95 |
| 5 | | |
| 6 | ) ) 3-level | 1.64 |
| 7 | 8-level | 0.95 |
| 8 | | |

FIG. 11 shows a graph of communicated S/N ratio (COM) on the vertical axis against channel S/N ratio (CH) on the horizontal axis for the pure 2-level symbol scheme (B) and the multiple-level symbol scheme (M). The pure 2-level scheme can be seen to provide inferior performance to the multiple-level symbol scheme M at channel S/N ratios below approximately 12.5 dB. In very poor channels the error values are maintained using the multiple-level symbol scheme with channel S/N ratios of up to 2 dB worse than the pure 2-level scheme. As previously, the limit of useful accuracy, 48 dB, is shown in a broken line.

As an alternative to non-coincident symbol durations and clock intervals, the communication time saved by the invention may be used to apply error correction or detection codes to the more significant bits of the digital word. One suitable code would be a convolutional code which provides two output bits for each input bit. Other coding techniques, such as Hamming Codes may be applied. Error detection or correction coding bits for those more significant bits, which are probably communicated as two-state symbols, may be arranged to be communicated with the less significant bits as part of a multi-state symbol.

From reading the present disclosure, other modifications will be apparent to persons skilled in the art. Such modifications may involve other features which are already known in the design, manufacture and use of systems for communicating digital data words and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A system for communicating digital data words, comprising a) means for generating a first symbol, having a duration equal to a bit length in the digital data words, in response to a more significant section of each digital data word, b) means for generating a second symbol, having a duration equal to a bit length in the digital data words, in response to a less significant section of each digital data word, the second symbol being generated according to a type of modulation having a greater number of states than the modulation type resulting in the first symbol, c) means for combining the first and second symbols to provide an encoded symbol, d) means for transmitting the encoded symbol, e) means for receiving the transmitted encoded signal, f) means for separating a received signal into first and second symbols, g) means for deriving a more significant section of received data from the first symbol, h) means for deriving a less significant section of received data from the second symbol, and i means for combining the more significant section and the less significant section of the received data to provide an output digital data word.

2. A system as claimed in claim 1, wherein the the first symbol represents fewer bits of each digital data word than the second symbol.

3. A system as claimed in claim 1, wherein the first symbol and the second symbol are transmitted simultaneously.

4. A system as claimed in claim 1, wherein the means for generating the first symbol and the means for generating the second symbol are arranged to provide symbols having an equal average power.

5. A digital data transmission arrangement comprising means for generating a first symbol, having a duration equal to a bit length of the digital data words, in response to a more significant section of each digital data word, means for generating a second symbol, having a duration equal to a bit length of the digital data words, in response to a less significant section of each digital data word, the second symbol being generated according to a modulation type having a greater number of states than the modulation type resulting in the first symbol, means for combining the first and second symbols to provide an encoded signal, and means for transmitting the encoded signal.

6. An arrangement as claimed in claim 5, wherein the first symbol represents fewer bits of each digital data word than the second symbol.

7. An arrangement as claimed in claim 5, further comprising means for generating third, fourth, fifth and sixth symbols, wherein the first, third, fourth and fifth symbols are generated in response to the four most significant bits of the more significant section of the digital data word respectively, and wherein the second symbol and the sixth symbol are generated in response to the four least significant bits of the less significant section of the digital data word.

8. A digital reception arrangement comprising means for receiving a transmitted signal, means for separating a received signal into first and second symbols, means for deriving a more significant section of received data from the first symbol, means for deriving a less significant section of received data from the second symbol, and means for combining the more significant section and the less significant section of the received data to provide an output digital data word, wherein the bits of the output digital data word each have a same duration as the first and second symbols.

9. A system for coding digital data words, comprising means for generating a first symbol, having a duration equal to a bit length of the digital data words, in response to a more significant section of each digital data word, means for generating a second symbol, having a duration equal to a bit length of the digital data words, in response to a less significant section of each digital data word, the second symbol being generated according to a modulation type having a greater number of states than the modulation type resulting in the first symbol, and means for combining the first and second symbols to provide an encoded signal.

10. A system for deriving a digital data word from an encoded signal, comprising means for separating an encoded signal into first and second symbols, means for deriving a more significant section of data from the first symbol, means for deriving a less significant section of data from the second symbol, and means for combining the more significant section and the less significant section of the data word to provide the digital data word, wherein the bits of the digital data word each have a same duration as the first and second symbols.

11. A data encoder comprising a) means for separating digital words into at least first and second groups of bits, each group of bits having at least one bit, the first group of bits being more significant than the second group of bits;

b) first means for amplitude modulating the first group of bits, according to a first amplitude modulation scheme having a first number of amplitude levels, to yield at least one first symbol;

c) second means for amplitude modulating the second group of bits, according to a second amplitude modulation scheme having a second number of amplitude levels, which second number is greater than the first number, to yield at least one second symbol, which second symbol is of lesser duration than the first symbol; and d) means for combining the first and second symbols.

12. The encoder of claim 11 wherein the digital word has four bits, the first number is two, the first amplitude modulating means converts the first group into first and second two amplitude level first symbols, the second number is four, the second amplitude modulating means converts the second group into one four amplitude level second symbol.

13. The encoder of claim 11 wherein the digital word has eight bits, the separating means separates the word into first, second, and third groups, the first group including the most significant bit, the second group including the fifth and most significant bits, the third group including the sixth seventh and eighth most significant bits, the first number is two, the first amplitude modulating means converts the first group into four two level first symbols, the second number is three, the second amplitude modulating means converts the second group into one three level second symbol, the transmitter further comprises third means for amplitude modulating the third group of bits according to a third amplitude modulating scheme having six amplitude levels to yield a single six level third symbol.

14. A transmitter comprising the encoder of claim 11.

15. The transmitter of claim 14 comprising means for transmitting the at least one first symbol on a first quadrature channel and the at least one second symbol on a second quadrature channel.

16. A data transmitter comprising
a) means for separating digital words into at least first and second groups of bits, each group of bits having at least one bit, the first group of bits being more significant than the second group of bits;
b) first means for phase shift keying the first group of bits, according to a first phase shift keying scheme having a first number of phase angles, to yield at least one first symbol;
c) second means for phase shift keying the second group of bits according to a second phase shift keying scheme having a second number of phase angles, to yield at least one second symbol, which at least one second symbol is of lesser duration than the at least one first symbol;
d) means for combining the at least one first and second symbols; and
e) means for transmitting an output of the means for combining.

17. The encoder of claim 16 wherein
the digital word has four bits,
the first number is two,
the first keying means converts the first group into first and second first symbols,
the second number is four,
the second keying means converts the second group into one second symbol.

18. The encoder of claim 16 wherein
the digital word has eight bits,
the separating means separates the word into first, second, and third groups, the first group including the most significant bit, the second group including the fifth and sixth most significant bits, the third group including the sixth, seventh, and eighth most significant bits,
the first number is two,
the first keying means converts the first group into four first symbols,
the second number is six,
the second keying means converts the second group into one second symbol,
the transmitter further comprises third means for phase shift keying the third group of bits according to a third phase shift keying scheme having six phase values to yield at least one third symbol.

19. A transmitter comprising the encoder of claim 16.

20. A decoder comprising
a) means for separating a received encoded signal into
 i) at least one first symbol, which is amplitude modulated according to an amplitude modulation scheme having a first number of levels, and
 ii) at least one second symbol, which is amplitude modulated according to an amplitude modulation scheme having a second number of levels, the at least one second symbol having a shorter duration than the at least one first symbol
b) first means for demodulating the at least one first symbol into a first group of more significant bits of a digital data word;
c) second means for demodulating the at least one second symbol into a second group of less significant bits of a digital data word; and
d) means for combining the first and second groups to provide the digital data word.

21. The decoder of claim 20 wherein,
the digital data word has four bits
the first number is two,
the at least one first symbol comprises first and second first symbols,
the second number is four, and
the at least one second symbol comprises only one second symbol.

22. The decoder of claim 20 wherein,
the digital data word has eight bits,
the separating means separates the received encoded signal into the at least one first symbol, the at least one second symbol, and at least one third symbol, which is amplitude modulated according to an amplitude modulation scheme having a third number of levels,
the first number is two,
the at least one first symbol comprises four first symbols, representing the four most significant bits of the digital data word,
the second number is three,
the at least one second symbol comprises only one second symbol, representing the fifth and sixth most significant bits of the digital data word,
the third number is six, and
the decoder further comprises third means for demodulating only one third symbol, which represents the least three significant bits of the digital data word.

23. A receiver comprising the decoder of claim 20.

24. A decoder comprising
a) means for separating a received encoded signal into
 i) at least one first symbol, which is phase shift keyed according to a phase shift keying scheme having a first number of phase angles, and
 ii) at least one second symbol, which is phase shift keyed according to an phase shift keying scheme having a second number of phase angles, the at least one second symbol having a shorter duration than the at least one first symbol,
b) first means for demodulating the at least one first symbol into a first group of more significant bits of a digital data word;
c) second means for demodulating the at least one second symbol into a second group of less significant bits of a digital data word; and
d) means for combining the first and second groups to provide the digital data word.

25. The decoder of claim 24 wherein,
the digital data word has four bits
the first number is two,
the at least one first symbol comprises first and second first symbols,
the second number is four, and
the at least one second symbol comprises only one second symbol.

26. The decoder of claim 24 wherein,
the digital data word has eight bits,
the separating means separates the received encoded signal into the at least one first symbol, the at least one second symbol, and at least one third symbol, which is phase shift keyed according to an phase shift keying scheme having a third number of phase angles,
the first number is two,
the at least one first symbol comprises four first symbols, representing the four most significant bits of the digital data word,
the second number is three,
the at least one second symbol comprises only one second symbol, representing the fifth and sixth most significant bits of the digital data word,
the third number is six, and
the decoder further comprises third means for demodulating only one third symbol, which represents the three least significant bits of the digital data word.

27. A receiver comprising the decoder of claim 24.

* * * * *